Jan. 11, 1966     J. W. DAVISSON ETAL     3,228,290
LARGE APERTURE ANISOTROPIC ELECTRO-OPTIC SHUTTER
Filed Nov. 29, 1961     2 Sheets-Sheet 1
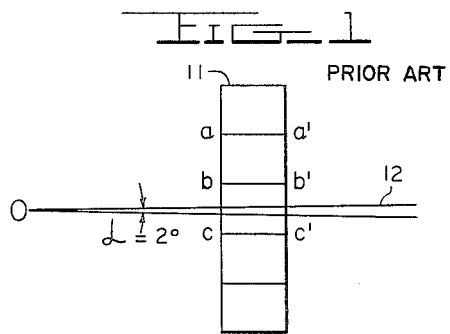
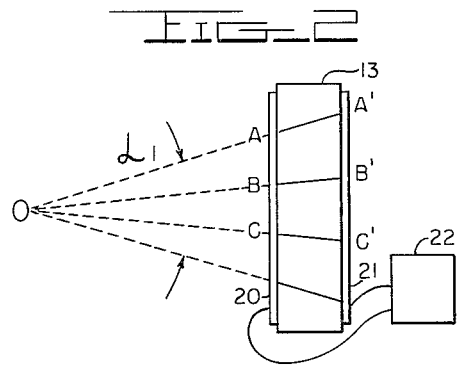
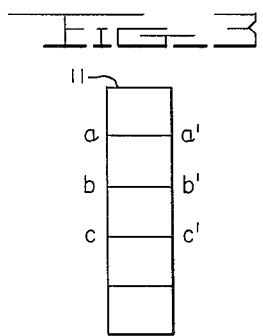
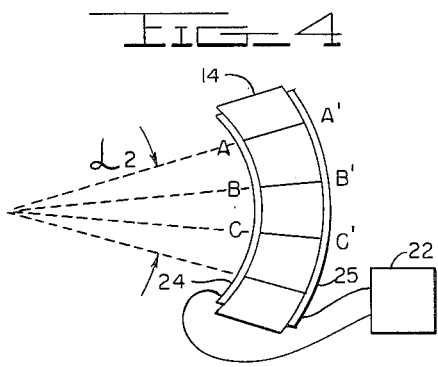
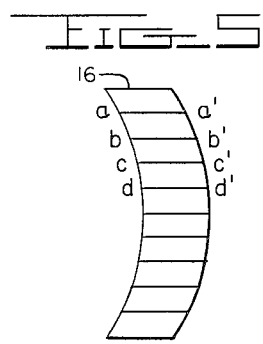
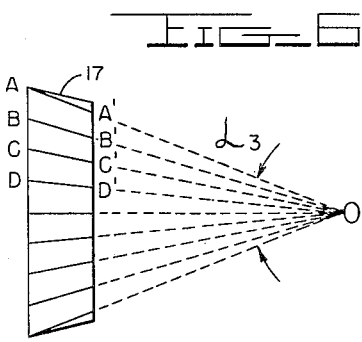
INVENTORS
JAMES W. DAVISSON
STEWART I. SLAWSON
BY
ATTORNEY

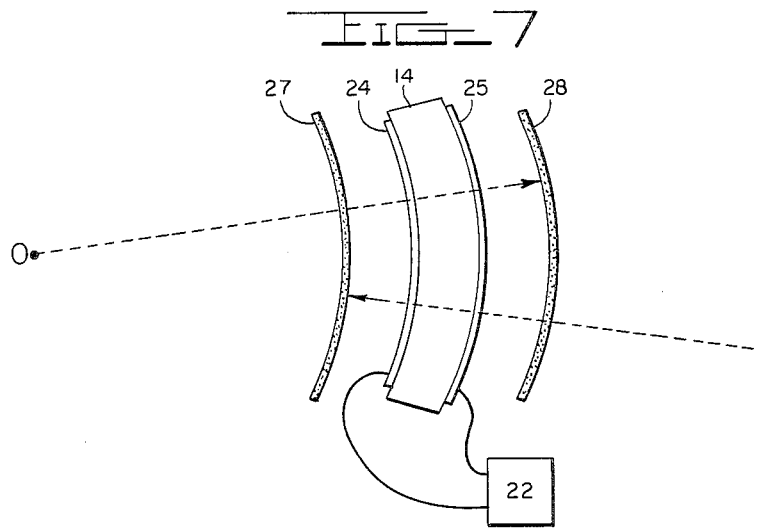
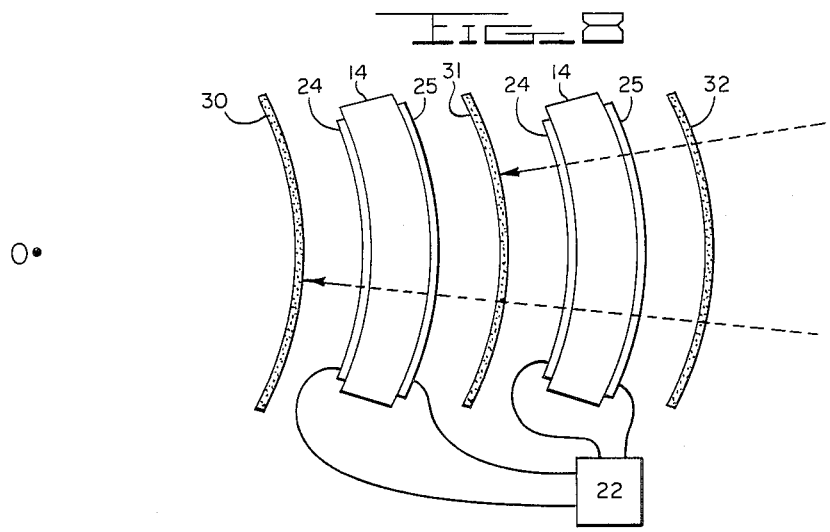
INVENTORS
JAMES W. DAVISSON
STEWART I. SLAWSON

United States Patent Office 3,228,290
Patented Jan. 11, 1966

3,228,290
LARGE APERTURE ANISOTROPIC ELECTRO-
OPTIC SHUTTER
James W. Davisson, Oxon Hill, Md., and Stewart I. Slawson, Alexandria, Va., assignors to the United States of America as represented by the Secretary of the Navy
Filed Nov. 29, 1961, Ser. No. 155,873
9 Claims. (Cl. 88—61)
(Granted under Title 35, U.S. Code (1952), sec. 266)

The invention described herein may be manufactured and used by or for the Government of the United States of America for governmental purposes without the payment of any royalties thereon or therefor.

This invention relates to optic shutters in general and more particularly to electro-optic shutters having enlarged angular apertures.

Many devices exist in the prior art for providing reasonably fast response time for repeated closing and opening of shutters. However, where response time is of the order of microseconds, existing phototropic films and exploding wire or exploding mirror devices are inadequate, especially under circumstances such as those for providing flash blindness protection. Existing electro-optic crystal shutters are inadequate in their extremely narrow fields of view, i.e., approximately two degrees, their very fast response time (microsecond) being entirely acceptable.

Prior attempts to increase the field of view of electro-optic crystals involve the use of high index glass lens components or the use of phase-compensating crystals. None of these methods or devices have resulted in a usable shutter. The limitations of electro-optical crystal fields of view are attributable to the fact that closure is possible only for light that passes parallel or nearly parallel to the optic axis of the crystal. It is in the area of providing enlarged angular apertures which permit fields of view in the order of 40 degrees that the present invention lies.

Accordingly, it is an object of the present invention to provide an electro-optic shutter having a field of view of the order of 40 degrees.

It is a further object of this invention to provide an electro-optic crystal shutter which produces extinction over a field of view that is limited only by the diameter of the crystal and its radius of curvature.

It is a still further object of this invention to provide an electro-optic crystal shutter having a plurality of optic axes in a single crystal.

It is a still further object of the present invention to provide a curved shutter plate in which the optic axis is everywhere normal to the surface of the plate whereby transmission of polarized light through the plate may be electrically controlled.

It is a still further object of the present invention to provide an electro-optic crystal shutter wherein extinction of polarized light is obtained through a pair of nested curved plates.

Other objects and many of the attendant advantages of this invention will be readily appreciated as the same becomes better understood by reference to the following detailed description when considered in connection with the accompanying drawings wherein:

FIG. 1 illustrates the present state of the art in electro-optic shutters.

FIG. 2 illustrates one embodiment of the present invention.

FIG. 3 illustrates a crystal plate prior to being formed into an embodiment of the invention.

FIG. 4 illustrates the embodiment formed from the crystal of FIG. 3.

FIG. 5 illustrates a crystal structure used in an alternative embodiment of the invention.

FIG. 6 shows the embodiment of the present invention formed from the crystal of FIG. 5.

FIG. 7 illustrates the embodiment of FIG. 4 between two polarizers.

FIG. 8 illustrates two nesting crystals of the embodiment of FIG. 4 between crossed polarizers.

Referring now to FIG. 1, there is shown an optical crystal 11 having parallel optic axes $a$–$a'$, $b$–$b'$, $c$–$c'$ etc., and light rays 12 diverging at an angle of 2° from point "0" which is substantially the field of view attainable through flat crystals. FIG. 2 shows crystal 13 having a plurality of optic axes $A$–$A'$, $B$–$B'$, $C$–$C'$ etc., which meet at a common point "0" and which will permit passage of light rays from a wide field of view, one which is limited only by the dimensions of crystal 13. Electrodes 20 and 21 are attached to respective surfaces of crystal 13 and are energized from a source of voltage 22 through which the shutter is in effect opened or closed. Crystal 11 is generally a transparent Z-cut crystal plate having a plurality of axes.

In FIGS. 3 and 4 crystal 11 is shown, respectively, before and after being formed into a concavo-convex surface. The formed crystal 14 is shown only in cross-section, with forming accomplished in the manner described in an application co-pending before the Patent Office, Serial No. 83,595, filed January 18, 1961, now Patent No. 3,124,623, issued March 10, 1964 entitled "Method of Shaping Crystal Blanks," the inventor being one of the co-inventors hereof, Stewart I. Slawson. In forming the crystal into a spherically contoured surface the parallel optic axes, $a$–$a'$, $b$–$b'$, $c$–$c'$ etc. of FIG. 3, become convergent optic axes $A$–$A'$, $B$–$B'$, $C$–$C'$ etc. of FIG. 4 which permit the passage of light from a plurality of directions thereby providing an angular aperture $\alpha 2$ which is substantially larger than $\alpha$ in FIG. 1. Electrodes 24 and 25 are identical in function to electrodes 20 and 21 of FIG. 2, and energy is likewise obtained from an identical source, 22.

The crystal of FIG. 2 may be constructed by assembling a mosaic of tilted crystal blocks each, for example, replacing one of the divisions of crystal 11 in FIG. 1. A mosaic so constructed should necessarily exhibit poorer light extinction and light passage than a single crystal surface, and should also be expensive to prepare. However, it is considered that such a mosaic is within the concept of this invention, and notwithstanding its relative deficiencies is nevertheless a substantial improvement over the present methods of combining several crystal plates to provide special high index glass compound lens components which may possibly provide angular apertures of about 20°.

FIGS. 5 and 6 illustrate an alternate method of forming multiaxial crystals in which the original crystal 16 is concavo-convex but has parallel optic axes $a$–$a'$, $b$–$b'$, $c$–$c'$, etc. and the reverse of the change from crystal 11 to crystal 14 is accomplished through a slight variation from the method described in co-pending application, Serial No. 83,595. The crystal of FIG. 5 is flattened into that of FIG. 6 causing optic axes $a$–$a'$, etc. to become optic axes $A$–$A'$, $B$–$B'$, $C$–$C'$ etc. and permitting passage of light from a plurality of directions through crystal 17. The crystal of FIG. 6 can also be obtained by grinding a thick crystal 14 of FIG. 4 flat along faces A, B, C and $A'$, $B'$, $C'$. The plurality of converging optic axes in crystal 17 provides an angular aperture $\alpha 3$ which is substantially larger than $\alpha$ in FIG. 1. FIGS. 7 and 8 illustrate two means for using crystal 14 in conjunction with polarizers, the former showing a single crystal 14 between polarizer surfaces 27 and 28, while the latter shows a pair of crystals 14 between polarizer surfaces 30, 31 and 32. Electrodes 24 and 25 operated in connection with power source 22 provide means for opening and closing the electro-optic shutters. In FIG. 7, polarizers 27 and 28 may be in either crossed or parallel positions, and light passing parallel to an optic axis of crystal 14 is unmodified in the absence of a field applied through actuation of electrodes 24 and 25. Where polarizers 27 and 28 are crossed the shutter is normally closed and light converging upon point "0" or originating at point "0" will be extinguished without application of an electric field. The two nesting crystals of FIG. 8 are employed to improve upon the extinction quality of a single formed crystal, a single crystal having been found to transmit about 5 or 6 times as much light as does a pair of crossed polarizers. Therefore, to obtain extinction substantially equivalent to that obtained by crossed polaroids it has been found desirable to nest two formed crystals between alternate polaroids. In such an arrangement, the position of light leakage in one of the crystals will nearly always differ from the position of light leakage in the second crystal. Where crossed polarizers are interspersed with two crystals for normally closed operation, the outer polaroids are generally alike and the center crossed with respect to the outer. For normally open operation the three polarizers are in parallel position.

To obtain a pair of nesting formed crystals it has been found desirable to form two crystals together, separated by a thin sheet of polytetrafluoroethylene or similar substance having the property of non-adhesion to the crystals, by the method described in pending application, Serial No. 83,595.

In operation, the electro-optic shutter depicted in FIG. 7, when suitably electroded and placed between polarizer sheets, can serve when used with parallel polarizers as a wide-angle ophthalmic electro-optic shutter with the pupil of the eye placed at "0," or when used with crossed polarizers as a light flashing or signalling device, or as a modulator, with the light apertured or focused at "0." This aperture may have a diameter of ⅛ inch. The optical transmission of such an arrangement has been compared at various exposure times with the equivalent transmission of a flat uniaxial crystal with the result that almost complete uniform extinction was obtained via the device of FIG. 7 over a field of 39 degrees while in comparison a uniaxial interference cross yielding extinction over a field of only about 2 degrees is obtained through substitution of an equivalent flat crystal.

In the present electro-optic crystal shutter the amount of light transmitted is a function of the voltage applied to the crystal, with the electrical field acting to make the crystal biaxial. A phase retardation is introduced such that linearly polarized light upon passing through the crystal parallel to the initial axial direction becomes elliptically polarized the eccentricity of which is a function of the voltage. A component of this elliptically polarized light is passed by the second polarizer. When an appropriate voltage is applied a retardation amounting to a half wavelength of light is introduced and the shutter is completely open, that is, all light passing the initial polarizer is passed by the second polarizer.

Although the extinction quality of a single formed crystal is good, it nevertheless transmits about 5 or 6 times as much light as do crossed polarizers alone. Thus to obtain desired extinction, it is necessary to use two nesting crystals interspersed between crossed polaroids as shown in FIG. 8. Such a system provides an extinction quality better than that of crossed polaroids alone.

Where parallel polarizers are used, the shutter is normally open and is closed only when a specific voltage is applied to the crystal. However, it is more difficult to achieve complete or nearly complete extinction when parallel polarizers rather than crossed polarizers are used since the retardation introduced by the field is a function of the wavelength of light. The result is that a single crystal closed by means of an electrical field will pass either blue or red light. By using two nesting crystals and applying a different voltage to each so that one is red transmitting and the other blue transmitting, good extinction over the visible range of the spectrum can be achieved. The device of FIG. 8 may be used as an ophthalmic shutter, its effectiveness being open to improvement by the application of different voltages to the crystals and possibly by obtaining a degree of color filtering by means of optical color films.

Obviously many modifications ad variations of the present invention are possible in the light of the above teachings. It is therefore to be understood that within the scope of the appended claim the invention may be practiced otherwise than as specifically described.

What is claimed is:

1. A large aperture electro-optic crystal shutter comprising at least one transparent Z-cut crystal having a plurality of diverging optic axes with a common point of convergence, said crystal being formed with a pair of opposing surfaces, a pair of transparent electrodes positioned one each on said surfaces of said crystal transverse to said axes, at least two polarizers disposed one each opposite each of said electrodes, and a source of electrical energy connected to said electrodes for stressing said crystal when actuated so as to control the amount of light passing through said shutter.

2. A large aperture electro-optic shutter comprising a plurality of shaped uniaxial crystals assembled together in a mosaic such that the optic axis of each of said crystals converges with the optic axis of every other of said crystals at a common point, each of said crystals being formed with a pair of opposing surfaces, a first transparent electrode being in contact with a first of said opposing surfaces of each of said crystals and a second transparent electrode being in contact with the other of said opposing surfaces of each of said crystals, said electrodes further being transverse to the optic axis of each of said crystals, at least two polarizers disposed one each opposite each of said surfaces of said crystals, and a source of electrical energy connected to said electrodes for stressing said crystals when actuated so as to control the amount of light passing through said shutter.

3. A large aperture electro-optic crystal shutter comprising at least one transparent Z-cut crystal having a plurality of diverging optic axes with a common point of convergence, said crystal being formed with a pair of opposing flat surfaces, a pair of transparent electrodes positioned one each on said surfaces of said crystal transverse to said axes, at least two polarizers disposed one each opposite each of said surfaces of said crystal, and a source of electrical energy connected to said electrodes for stressing said crystal when actuated so as to control the amount of light passing through said shutter.

4. A large aperture electro-optic crystal shutter comprising at least one transparent Z-cut crystal having a plurality of diverging optic axes with a common point of convergence, said crystal being formed with a pair of opposing concavo-convex surfaces, a pair of transparent electrodes positioned one each on said surfaces of said crystal transverse to said axes, at least two polarizers disposed one each opposite each of said surfaces of said crystals, and a source of electrical energy connected to said electrodes for setting said crystal when actuated so as to control the amount of light passing through said shutter.

5. A normally open large aperture electro-optic crystal shutter comprising at least one transparent Z-cut crystal having a plurality of diverging optic axes with a common point of convergence, said crystal being formed with a pair of opposing concavo-convex surfaces, a pair of transparent electrodes positioned one each on said surfaces of said crystal transverse to said axes, a pair of parallel polarizers disposed one each opposite a respective electrode, and a source of electrical energy connected to said electrodes for stressing said crystal when actuated so as to block a substantial amount of light from passing through said shutter.

6. A normally closed large aperture electro-optic crystal shutter comprising at least one transparent Z-cut crystal having a plurality of diverging optic axes with a common point of convergence, said crystal being formed with a pair of opposing concavo-convex surfaces, a pair of transparent electrodes positioned one each on said surfaces of said crystal transverse to said axes, a pair of crossed polarizers disposed one each opposite a respective electrode, and a source of electrical energy connected to said electrodes for stressing said crystal when actuated so as to permit passage of a substantial amount of light through said shutter.

7. A normally closed large aperture electro-optic crystal shutter comprising at least a pair of transparent Z-cut crystals each having a plurality of diverging optic axes with a common point of convergence, said crystals each being formed with a pair of opposing concavo-convex surfaces, a plurality of transparent electrodes positioned one each on said surfaces of each of said crystals transverse to said axes, at least a pair of parallel polarizers disposed one each opposite the outer two of said electrodes, at least one crossed polarizer disposed between the inner two of said electrodes, and a source of electrical energy connected to said electrodes for stressing said crystals when actuated so as to control the passage of light through said shutter.

8. A normally open large aperture electro-optic crystal shutter comprising at least a pair of transparent Z-cut crystals each having a plurality of diverging optic axes with a common point of convergence, said crystals each being formed with a pair of opposing concavo-convex surfaces, a plurality of transparent electrodes positioned one each on said surfaces of each of said crystals transverse to said axes, at least three parallel polarizers disposed one each opposite each of said electrodes, and a source of electrical energy connected to said electrodes for stressing said crystals when actuated so as to block substantially all light from passing through said shutter.

9. A large aperture electro-optic crystal shutter comprising at least a pair of transparent Z-cut crystals each having a plurality of diverging optic axes with a common point of convergence and each being formed with a pair of opposing surfaces, said crystals being spatially disposed along a longitudinal axis, a plurality of transparent electrodes positioned one each on the surfaces of each of said crystals transverse to said axes, a plurality of parallel polarizers interspersed one each between said crystals and one each opposite the outer surface of the outer of said crystals, and a source of electrical energy connected to said electrodes for stressing said crystals when actuated so as to permit passage of a selected color of light through said shutter upon the application of a selected voltage.

References Cited by the Examiner
UNITED STATES PATENTS

| | | | |
|---|---|---|---|
| 2,705,903 | 4/1955 | Marshall | 88—61 |
| 2,780,958 | 2/1957 | Wiley | 88—61 |
| 2,811,898 | 11/1957 | West | 88—61 |
| 2,990,664 | 7/1961 | Cepero | 51—284 |
| 3,124,623 | 3/1964 | Slawson. | |
| 3,167,607 | 1/1965 | Marks et al. | 88—61 |

JEWELL H. PEDERSEN, *Primary Examiner.*

JAY L. CHASKIN, RONALD L. WIBERT,
*Assistant Examiners.*

UNITED STATES PATENT OFFICE
CERTIFICATE OF CORRECTION

Patent No. 3,228,290         Dated January 11, 1966

Inventor(s) James W. Davisson and Stewart I. Slawson

It is certified that error appears in the above-identified patent and that said Letters Patent are hereby corrected as shown below:

Column 3, Lines 16, 18, 23, 65 and 67
change "polaroid" to -- Polaroid --.

SIGNED AND
SEALED
NOV 24 1970

(SEAL)
Attest:

Edward M. Fletcher, Jr.
Attesting Officer

WILLIAM E. SCHUYLER, JR.
Commissioner of Patents